Patented May 12, 1953

2,638,471

UNITED STATES PATENT OFFICE 2,638,471

THIENYL AND PYRIDYL ESTERS

Alfred Burger, Charlottesville, Va., assignor to Smith, Kline & French Laboratories, Philadelphia, Pa., a corporation of Pennsylvania No Drawing. Application June 15, 1948, Serial No. 33,220

6 Claims. (Cl. 260—247.2)

This invention relates to certain new chemical compounds which may be more particularly defined as thienyl and pyridyl cycloalkyl esters and which have physiological activity more particularly local anesthetic and antispasmodic activity, and to method involved in their preparation.

Broadly speaking, the compounds contemplated by this invention will be illustrated by the following general structure:

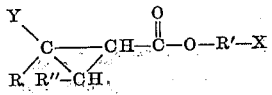

in which Y is a member of the group consisting of 2-thienyl and 2-pyridyl; R is hydrogen when Y is 2-pyridyl and R is hydrogen or 2-thienyl when Y is 2-thienyl; R'' is a member of the group consisting of hydrogen, aryl and substituted aryl, R' is an alkylene group of not more than 3 carbon atoms and X is a member of the group consisting of tertiary nitrogen linked amino groups containing a member of the group consisting of two alkyl groups, two alicyclic groups and a heterocyclic structure.

It is believed that physiological activities of the compounds in accordance with this invention reside in the fact that they are amino alcohol esters of the unique substituted cyclopropane carboxylic acids.

Generally speaking, the compounds in accordance with this invention, and having the structure of the above general formula, will be prepared by procedure involving the method in accordance with this invention by reacting ethyl diazoacetate and 2-vinyl pyridine, which is known to the art, or 2-vinyl thiophene, which is known to the art, depending upon whether a pyridyl or a thienyl compound is to be produced for the formation of an ester, converting the ester to the corresponding acid, for example, by saponification of the ester, and esterifying the acid by any well known procedure, as by converting to the acid chloride, by any well known procedure, as, for example, by treatment with thionyl chloride, and treating with an amino alcohol having the desired substituent for X, as defined in connection with the above general formula, or treating the acid directly with the amino alcohol in the presence of a catalyst.

As more specifically illustrative of compounds in accordance with this invention and as illustrative of procedure for their production, for example:

Example 1

Ethyl 2-(2-pyridyl)-cyclopropane carboxylate will be prepared as follows:

A mixture of 50 g. of ethyl diazoacetate and 20 g. of freshly distilled 2-vinyl-pyridine (which may be stabilized with 0.1% of hydroquinone) is added to 50 g. of vinyl-pyridine preheated to 130°. The exothermic reaction raises the temperature to about 155°, and nitrogen is evolved rapidly. After another 30 minutes at 140°, the mixture is fractionated; a forerun, and then 45 g. of a pale yellow oil, B. P. 125–140° (5 mm.) is collected. The latter fraction is refractionated and 34 g. of a distillate, B. P. 120.5–121.5° (5 mm.) is obtained.

2-(2-pyridyl)-cyclopropane carboxylic acid. A solution of 29 g. of the ester in 50 cc. of ethanol is mixed with a suspension of 8 g. of sodium hydroxide in 9 cc. of water. The mixture is refluxed for six hours and the volatile solvents are removed. The solid residue is dried in a desiccator and then boiled with 125 cc. of thionyl chloride for six hours. Excess thionyl chloride is removed under reduced pressure, the last traces with the aid of benzene. The dark tarry residue is decomposed with water. The solution is clarified with charcoal and the filtrate is neutralized to pH 6.8 with ammonium hydroxide. Exhaustive extraction with ether renders an almost colorless crystalline acid which is recrystallized from benzene-petroleum ether to M. P. 97–99°.

The hydrochloride, prepared in ether solution, consists of colorless crystals, M. P. 87–89°.

Esterification of the carboxylic acid for production of the end product will be effected as follows:

(a) To a mixture of 22 g. of 2-(2-pyridyl) cyclopropane carboxylic acid, 25 g. of diethylaminoethanol and 150 cc. of toluene is added 5 cc. of concentrated sulfuric acid. The mixture is heated on a steam bath from six to eight hours, cooled, and neutralized with aqueous alkali. The toluene is separated, the water solution extracted with toluene, the combined toluene solutions are dried over sodium sulfate and fractionated.

(b) The crude acid chloride obtained above is distilled, and to the distillate, dissolved in 100 cc. of dry benzene, is slowly added a solution of 50 g. of β-(4-morpholino) ethyl alcohol in 50 cc. of dry benzene at 20–30°. After standing for 1 to 2 days, the separated solid hydrochloride of the basic ester is filtered, washed with ether and recrystallized.

*Example 2*

Ethyl 2-(2-thienyl)-cyclopropane carboxylate will be prepared as follows:

A mixture of 9 g. of ethyl diazoacetate and 4 g. of 2-vinylthiophene (prepared according to Nazzaro and Bullock, J. Am. Chem. Soc., 68, 2121 (1946) is condensed as described for the pyridine analog, and 3 g. of the ester, B. P. 115–117° (4 mm.) is obtained.

2-(2-thienyl) cyclopropane carboxylic acid will be prepared as follows:

Three grams of the ester is saponified with a solution of 1 g. of sodium hydroxide in 30 cc. of ethanol and 2 cc. of water by refluxing for seven hours. The alcohol is distilled, the residual solution diluted with 50 cc. of water and extracted with ether. Acidification of the alkaline aqueous solution gives an oily material which crystallizes on standing at 4°. The dried material is converted to the acid chloride by refluxing for four hours with 22 cc. of thionyl chloride, the excess reagent is removed, and the oily acyl halide is distilled. It boils around 107° (4 mm.).

Decomposition of the pale yellow oil with water renders an oily product which crystallizes soon. Recrystallization from water at 45° and cooling leads to colorless crystals, M. P. 58–60°.

Esterification of the carboxylic acid for production of the end product will be effected as follows:

(a) One gram of the acyl chloride is dissolved in 10 cc. of dry ether, and 0.8 g. of tropinol dissolved in 10 cc. of benzene is added at 20°. After standing overnight, absolute ether is added to complete the separation of the tropinol ester salt, and this is filtered and recrystallized.

(b) 1.6 grams of the acid is treated with a solution of 0.9 g. of dimethylaminoethanol in 10 cc. of toluene. 1 cc. of concentrated $H_2SO_4$ is added, the mixture is refluxed for 7 hours and worked up by neutralization with aqueous alkali, drying of the toluene solution and fractionation.

Having prepared the pyridylcyclopropane carboxylic acid or the thienylcyclopropanecarboxylic acid as described in Examples 1 and 2 above, the various products in accordance with this invention and as defined in the above general structural formula may be prepared by following the esterification procedure described in Examples 1 and 2, or other well known esterification procedure using an amino alcohol having the substituent for the particular product within the above general formula.

A wide variety of amino alcohols may be used in the preparation of the new esters. Among the amino alcohols which may be used are the following:

β-Dimethylaminoethanol
β-Diethylaminoethanol
β-Dibutylaminoethanol
2-piperidinoethanol
2-(4-morpholinoethanol)
Tropine
Phenylethylamino ethanol
3-piperidinopropanol
2-piperidinopropanol
3-diethylaminopropanol
3-dimethylaminopropanol
3-dipropylaminopropanol
3-di-n-butylaminopropanol
3-piperidinopropan-1,2-diol As more particularly illustrative of specific compounds of various types in accordance with this invention having the structure of the above general formula, the following will be noted:

1-(β-diethylaminoethyl)-2-(2-thienyl) cyclopropane carboxylate having the formula

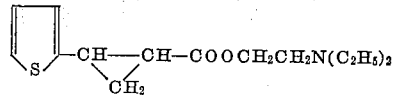

1-(β-dimethylaminoethyl)-2-(2-thienyl) cyclopropane carboxylate having the formula

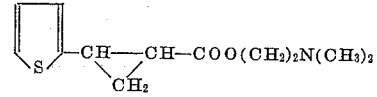

1-[2-(4-morpholinoethyl)]-2-(2-thienyl) cyclopropane carboxylate having the formula

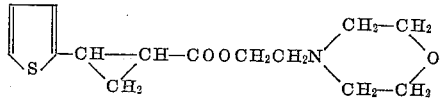

1-(3-piperidinopropyl)-2-(2-thienyl) cyclopropane carboxylate having the formula

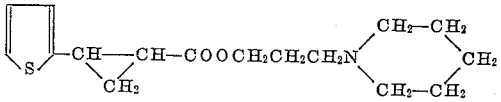

1-(2-piperidinopropyl)-2-(2-thienyl) cyclopropane carboxylate having the formula

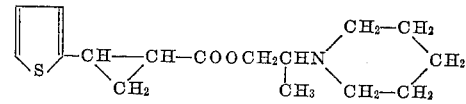

1-(2-diethylaminoethyl)-2-(2-pyridyl) cyclopropane carboxylate having the formula

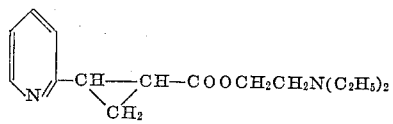

1-(2-piperidinoethyl)-2-(2-pyridyl) cyclopropane carboxylate having the formula

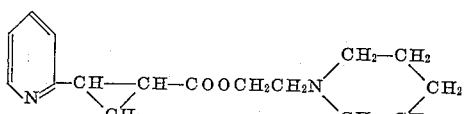

1-(3-di-n-propylaminopropyl)-2-(2-pyridyl) cyclopropane carboxylate having the formula

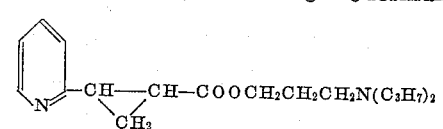

1-tropinyl-2-(2-pyridyl) cyclopropane carboxylate having the formula

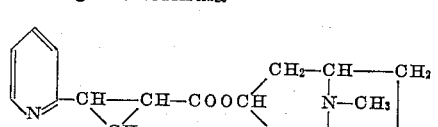

1-(2-diethylaminoethyl)-2,2-bis (2-thienyl) cyclopropane carboxylate having the formula

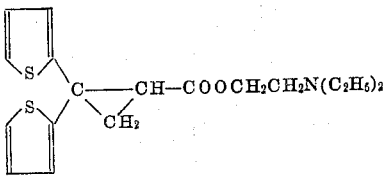

The starting material for this compound, 1,1-bis-(2-thienyl) ethylene, may be prepared by the method of Nahke, Ber., 30, 2038 (1893).

1-(3-dimethylaminopropyl)-2-(2-pyridyl)-3-phenylcyclopropane carboxylate having the formula

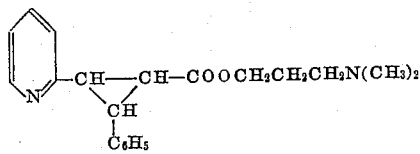

This compound may be prepared starting from α-stilbazole.

1-(2-piperidinoethyl)-2-(2-pyridyl)-3-(4-chlorophenyl) cyclopropane carboxylate having the formula

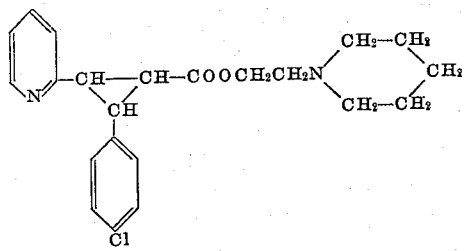

This compound may be prepared from p-chloro-α-stilbazole which can be obtained by the general method of Shaw and Wagstaff, J. Chem. Soc., 1933, 77.

1-(2-diethylaminoethyl)-2-(2-pyridyl)-3-(4-methoxyphenyl) cyclopropane carboxylate having the formula

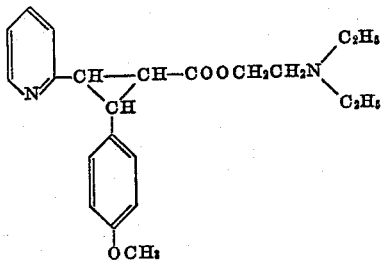

This compound may be prepared from p-methoxy-α-stilbazole which can be obtained by the general method of Shaw and Wagstaff, ibid.

Various types of compounds contemplated by this invention and included within the above general structural formula and the several compounds of the several types above exemplified, although numerous, will, as will be apparent to those skilled in the art, all be prepared by the procedure detailed above.

What I claim and desire to protect by Letters Patent is:

1. Compounds having the structure:

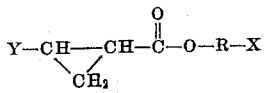

in which Y is a radical selected from the group consisting of 2-thienyl and 2-pyridyl; R is an alkylene group of not more than 3 carbon atoms, and X is selected from the group consisting of piperidino, morpholino and lower dialkyl amino groups.

2. 1-(2-diethylaminoethyl)-2-(2-pyridyl)-cyclopropane carboxylate

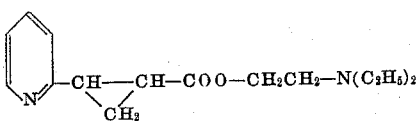

3. 1-[2-(4-morpholinoethyl)]-2-(2-pyridyl)-cyclopropane carboxylate

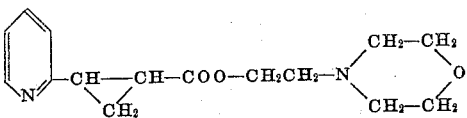

4. 1-(β-dimethylaminoethyl)-2-(2-thienyl)-cyclopropane carboxylate

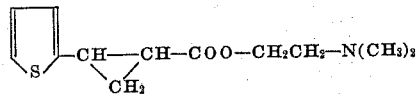

5. 1-(2-piperidinoethyl)-2-(2-pyridyl)-cyclopropane carboxylate

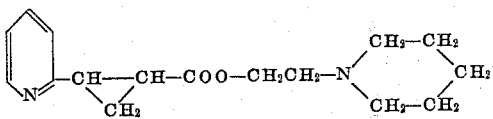

6. 1-(2-piperidinopropyl)-2-(2-thienyl)-cyclopropane carboxylate

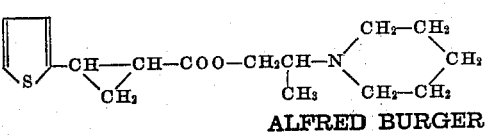

ALFRED BURGER.

References Cited in the file of this patent

UNITED STATES PATENTS

| Number | Name | Date |
| --- | --- | --- |
| 2,425,723 | Blicke | Aug. 19, 1947 |
| 2,501,858 | Suter | Mar. 28, 1950 |

FOREIGN PATENTS

| Number | Country | Date |
| --- | --- | --- |
| 249,036 | Switzerland | Mar. 16, 1948 |

OTHER REFERENCES

Beilstein, Vierte Auflage, vol. 9, page 619.
Hartman: California and Western Medicine, 66 (No. 4), 242-248 (1947).